G. N. CHENAULT.
CHOPPING ATTACHMENT.
APPLICATION FILED MAR. 17, 1919.
1,336,727.
Patented Apr. 13, 1920.
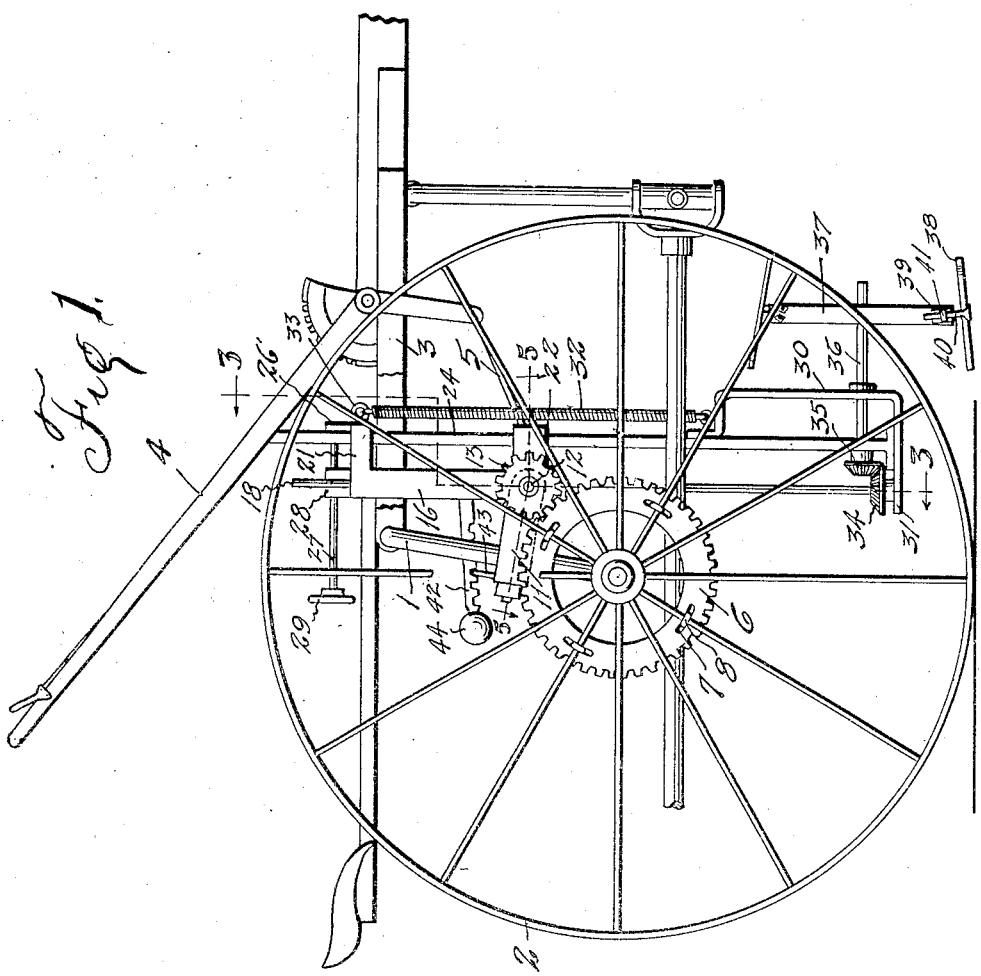
Inventor
G. N. Chenault,
By Jacob Schley
Attorney G. N. CHENAULT.
CHOPPING ATTACHMENT.
APPLICATION FILED MAR. 17, 1919.
1,336,727.
Patented Apr. 13, 1920.
2 SHEETS—SHEET 2.
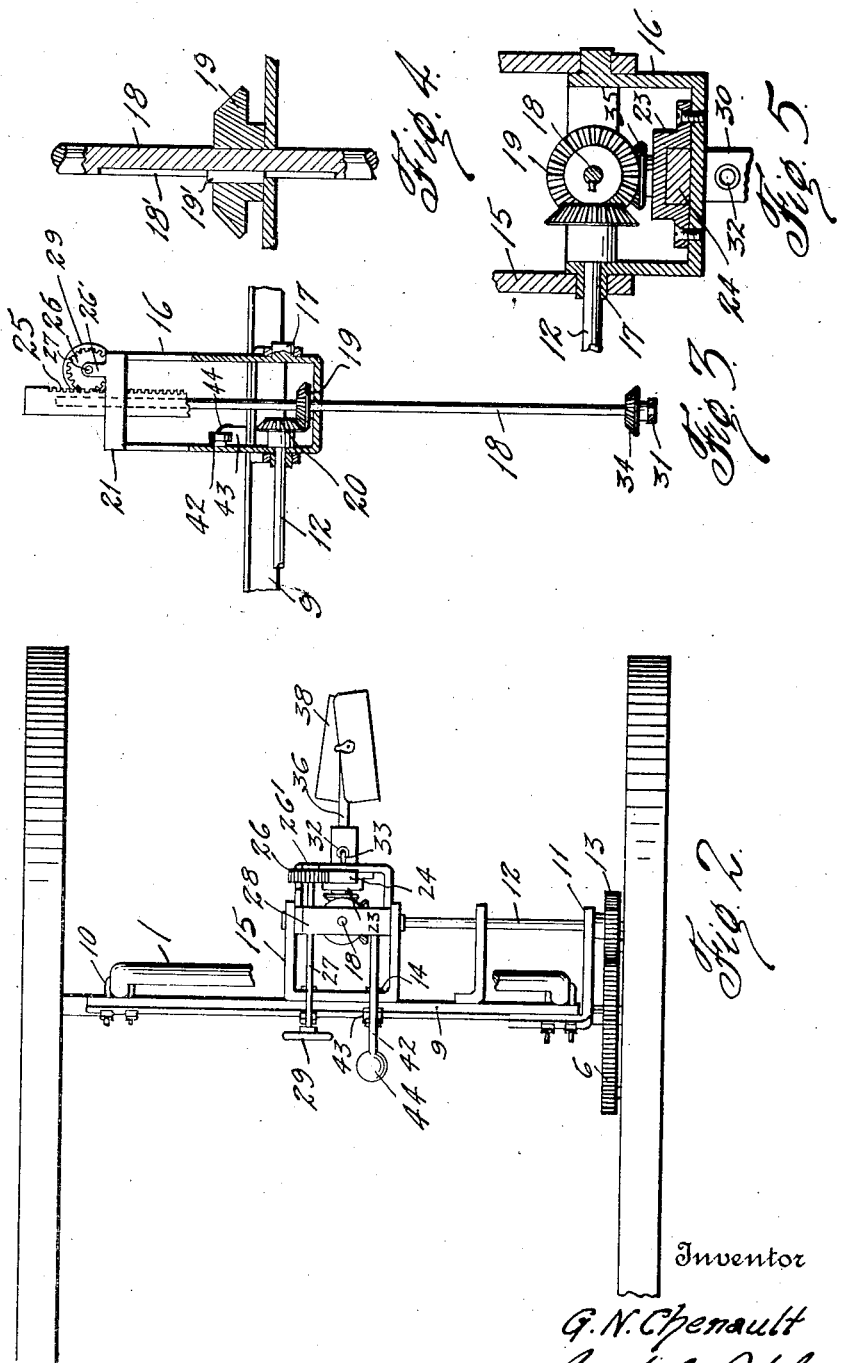
Inventor
G. N. Chenault
By
Attorney

UNITED STATES PATENT OFFICE.

GEORGE N. CHENAULT, OF FORNEY, TEXAS.

CHOPPING ATTACHMENT.

1,336,727.     Specification of Letters Patent.     Patented Apr. 13, 1920.

Application filed March 17, 1919. Serial No. 283,147.

*To all whom it may concern:*

Be it known that I, GEORGE N. CHENAULT, a citizen of the United States, residing at Forney, in the county of Kaufman and State of Texas, have invented certain new and useful Improvements in Chopping Attachments, of which the following is a specification.

This invention relates to new and useful improvements in chopping attachments.

The purpose of the invention is to provide a chopping attachment which may be mounted on the ordinary cultivator and readily adjusted both in harmony with the cultivator and in chopping relation to the row. Practically all cultivators have a balancing mechanism and it will be seen that a chopping attachment which may be adjusted in accordance with the balancing adjustment will operate more satisfactorily and efficiently. The attachment should also be easily adjusted vertically and should be compact, simple, and substantial.

In carrying out the invention I provide a support which is readily attachable to a cultivator. A supporting member is pivoted on the support so as to swing longitudinally of the cultivator, whereby it may be adjusted in accordance with balancing of the said cultivator. A vertically adjustable chopping mechanism is mounted in the member and is adjusted accurately by said member. Means for minutely adjusting the chopping mechanism vertically is provided and said mechanism is resiliently sustained, whereby the vertical adjustment is more easily carried out.

The invention will be more readily understood from a reading of the following specification and by reference to the accompanying drawings, in which an example of the invention is shown and wherein:

Figure 1 is a side elevation of a portion of a cultivator with a chopping attachment, constructed in accordance with this invention mounted thereon, Fig. 2 is a partial plan view of the same, Fig. 3 is a transverse vertical sectional view on the line 3—3 of Fig. 1, Fig. 4 is a detail of the sliding shaft key, and Fig. 5 is a cross sectional detail on the line 5—5 of Fig. 1.

In the drawings the numeral 1 designates the arch axle of a cultivator and 2 the ground wheels supporting the same. The axle is pivoted to the rear end of the top frame 3. The usual balancing lever 4 is pivoted on the frame and has connection with the axle by the usual links, only one of which 5 is shown. The foregoing parts are common in the art and detailed description and illustration of the same is considered unnecessary.

My attachment is designed to be immediately attached to the cultivator. The right-hand wheel 2 is removed and a gear ring 6 secured to the spokes on the inner side by means of hook-bolts 8 passing through concentric slots 7 in the ring which permits a circumferential adjustment of the ring to position the bolts for engagement with the spokes of different makes of cultivators. A supporting bar 9 is secured to the sides of the vertical legs of the axle by U-bolts 10 and extends across the cultivator. At the right hand end a bracket 11 is also fastened to the bar by a U-bolt. The bracket projects forward and supports the outer end of a counter shaft 12 on which a pinion 13 is fastened, the latter meshing with the gear ring.

At the center the bar has fastened thereto by bolts 14, a yoke 15. It is evident that when the lever 4 is swung to balance the cultivator, which involves the swinging or tilting of the axle, the pinion 13 will merely roll on the gear ring and the yoke will be swung with the bar. An upright frame 16 is provided on each side with trunnions 17, near its lower end. These trunnions are pivoted in the outer ends of the yoke, whereby the frame may be swung longitudinally of the cultivator. The frame receives a vertically sliding drive shaft 18 having a key-way 18' (Fig. 4). A beveled gear 19 surrounds the shaft and has a key 19' engaging in the key-way 18'. This gear rests on the bottom of the frame and is driven by a beveled gear 20 fastened on the inner end of the counter shaft 12 which is supported in the right-hand trunnion 17. It will be apparent that the shaft 18 may slide through the gear 19 but will be rotated by said gear.

A bracket 21 projects forward from the top of the frame and a similar bracket 22 extends forward from the lower portion of the frame. Keepers 23 are secured to the inner faces of the brackets and confine a vertically adjustable bar 24 which depends centrally from the frame. The bar has a gear rack 25 along one side at its upper end. A pinion 26 meshes with the rack and is fastened on a horizontal shaft 27 which is mounted at its forward end in an ear 26' on the bracket 21 and passes through a bearing box 28 on top of the frame. A hand wheel 29 is fastened on the rear end of the shaft 27 within easy reach of the driver. By turning the hand wheel the pinion 26 is revolved and the bar 24 raised or lowered. An angular bracket 30 fastened to front of the bar has a rearwardly directed arm 31 secured to the bottom of the bar and supporting the shaft 18. A coiled spring 32 extends upwardly from the bracket 30 and engages with an eye 33 on the front of the bracket 21. When the bar 24 is adjusted the drive shaft 18 is carried upward. It will be seen that the spring resiliently sustains the bar and shaft and tends to elevate the same, so that the raising of the parts by the hand wheel is not laborious.

A beveled gear 34 fastened on the lower end of the shaft 18 drives a smaller pinion 35 fastened on the rear end of a horizontal hoe shaft 36 mounted in the bar 24 and bracket 30. A hoe arm 37 is centrally fastened on the forward end of the hoe shaft 36 and angularly disposed seats 39 at its outer ends for receiving the shanks 40 of hoe blades 38. The shanks are fastened in the seats by bolts 41. It is obvious that hoes of various widths may be used and by disposing the hoes at an angle they will cut properly as the cultivator moves forwardly.

An adjusting lever 42 is pivoted to the inner side of the frame and is provided with notches in its under side. The lever extends rearward past the bar 9 and has a weighted handle 44. A lug 43 is fastened on the bar 9 by one of the bolts 14 and engages in one of the notches of the lever. The lever is above the pivot point of the frame. After the cultivator has been balanced by manipulating the lever 4, it is necessary to adjust the frame 16 so as to dispose the shaft 18 and bar 23 at the desired angle. This is accomplished by lifting the lever 42 and swinging the frame and dropping the lever so that one of its notches engages the lug 43.

As the cultivator is drawn along the row the counter shaft 12 will be revolved by the pinion 13 and the shaft 18 revolved by the gears 19 and 20. The shaft 36 will be revolved at a higher rate of speed than the shaft 18 by the gear 34 and smaller pinion 35. The plants and weeds will be chopped or blocked out at intervals, the spacing and size depending upon the length of the hoe blade used. The driver may easily raise or lower the chopping mechanism by adjusting the hand wheel 29.

What I claim is:
1. In a chopping attachment, a support adapted to be arranged transversely of a wheeled implement and connected with the arched portion of the axle thereof carrying the wheels, an upstanding frame pivotally connected with the support to swing in a substantially vertical plane longitudinally of said implement, means to lock the upstanding frame in a desired angular position with relation to the support, a vertically adjustable chopping mechanism carried by the upstanding frame, means to vertically adjust the chopping mechanism, and driving means connecting the chopping mechanism and one wheel, said driving means being connected with the upstanding frame and adapted to permit of the angular adjustment of said upstanding frame.

2. In a chopping attachment, a support for attachment to the arched axle of a wheeled implement, a frame pivotally mounted on the support, a counter shaft carried by the support, a pinion on the outer end of counter shaft, a gear ring attachable to an implement wheel and meshing with the pinion, means for fastening the frame in various arcuate adjustments, and a chopping mechanism vertically adjustable in the frame and depending therefrom.

3. In a chopping attachment, a support for attachment to the arched axle of a wheeled implement, a frame pivoted on the support, a counter shaft carried by the support, a pinion on the outer end of the shaft, a gear on the inner end of the shaft, a drive shaft slidable in the frame, a beveled gear on the slidable shaft meshing with the gear on the counter shaft, a bar slidable in the frame and supporting the drive shaft, a coiled spring depending from the frame and sustaining the bar, a chopping mechanism carried by the bar and driven from the drive shaft, means on the frame for vertically adjusting the bar, and means for arcuately adjusting the frame and holding it in adjusted positions.

4. In a chopping attachment, a support adapted for connection with the axle of a wheeled implement carrying the wheels, an upstanding frame pivotally connected with the support to swing in a substantially vertical plane longitudinally of said implement, means to swing the upstanding frame upon its pivot and lock the same in the desired angular position, chopping mechanism carried by the upstanding frame, and means to drive the chopping mechanism from one wheel, the driving means being connected with the upstanding frame and adapted to permit of its angular adjustment.

5. In a chopping attachment, a support adapted for connection with the axle of an implement and carrying the wheels, an upstanding frame pivotally connected with the support to swing in a substantially vertical plane longitudinally of the implement so that it may be angularly adjusted, a vertically adjustable element slidably engaging the upstanding frame, a rotatable chopper carried by said element, a rotatable upstanding shaft to drive the chopper and engaging the upstanding frame, a gear keyed upon the upstanding shaft to permit the shaft to move longitudinally with relation thereto and rotate with the same, a transverse counter shaft connected with the support, a gear connected with the inner end of the counter shaft and engaging the first named gear, a gear connected with the outer end of the counter shaft, and a gear ring secured to one wheel and engaging the last named gear.

In testimony whereof I affix my signature.

GEORGE N. CHENAULT.